United States Patent [19]

Jackson et al.

[11] 4,224,522

[45] Sep. 23, 1980

[54] DOSIMETER CHARGING AND/OR READING APPARATUS

[75] Inventors: Thomas P. Jackson; Laughton T. Fine, both of Cincinnati, Ohio

[73] Assignee: Dosimeter Corporation of America, Cincinnati, Ohio

[21] Appl. No.: 937,808

[22] Filed: Aug. 29, 1978

[51] Int. Cl.$^2$ ............................................. G01T 1/18
[52] U.S. Cl. .................................... 250/377; 250/378
[58] Field of Search ................ 250/374, 376, 377, 378

[56] References Cited

U.S. PATENT DOCUMENTS

| | | | |
|---|---|---|---|
| 2,765,413 | 10/1956 | Andrews | 250/377 |
| 3,193,749 | 7/1965 | Grimm et al. | 250/377 |

Primary Examiner—Alfred E. Smith
Assistant Examiner—Janice A. Howell
Attorney, Agent, or Firm—Wood, Herron & Evans

[57] ABSTRACT

A device is disclosed for charging and/or reading a capacitor associated with an electrometer incorporated in a radiation dosimeter for the purpose of initializing or "zeroing", the dosimeter at the commencement of a radiation measurement cycle or reading it at any time thereafter. The dosimeter electrometer has a movable electrode the position of which is indicative of the charge remaining on the dosimeter capacitor and in turn the amount of radiation incident on the dosimeter since it was zeroed. The charging device also includes means for discharging, immediately upon conclusion of the dosimeter capacitor charging operation, stray capacitance inherent in the dosimeter by reason of its mechanical construction. The charge on the stray capacitance, if not discharged at the conclusion of the dosimeter capacitor charging operation, leaks off during the measurement cycle, introducing measurement errors. A light source and suitable switch means are provided for automatically illuminating the movable electrode of the dosimeter electrometer as an incident to charging the dosimeter capacitor to facilitate reading the initial, or "zero", position of the movable electrometer electrode after the dosimeter capacitor has been charged and the stray capacitance discharged. Also included is a manually actuatable switch means, which is operable independently of the aforementioned automatic switch means, to energize the lamp and facilitate reading of the dosimeter without charging it.

5 Claims, 4 Drawing Figures

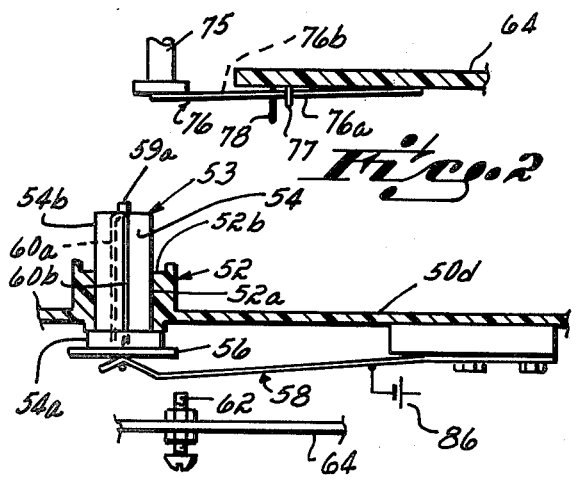
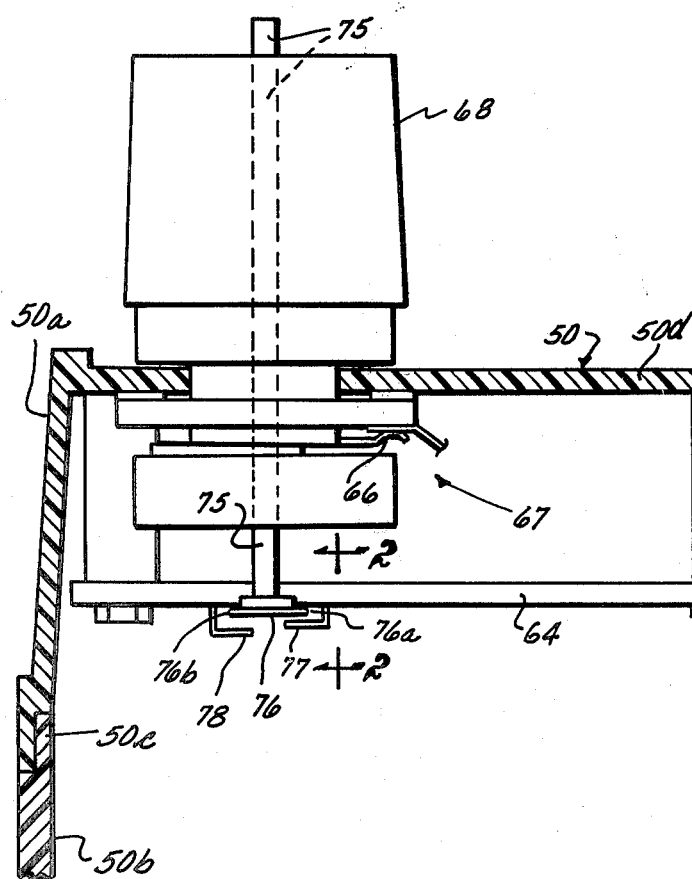
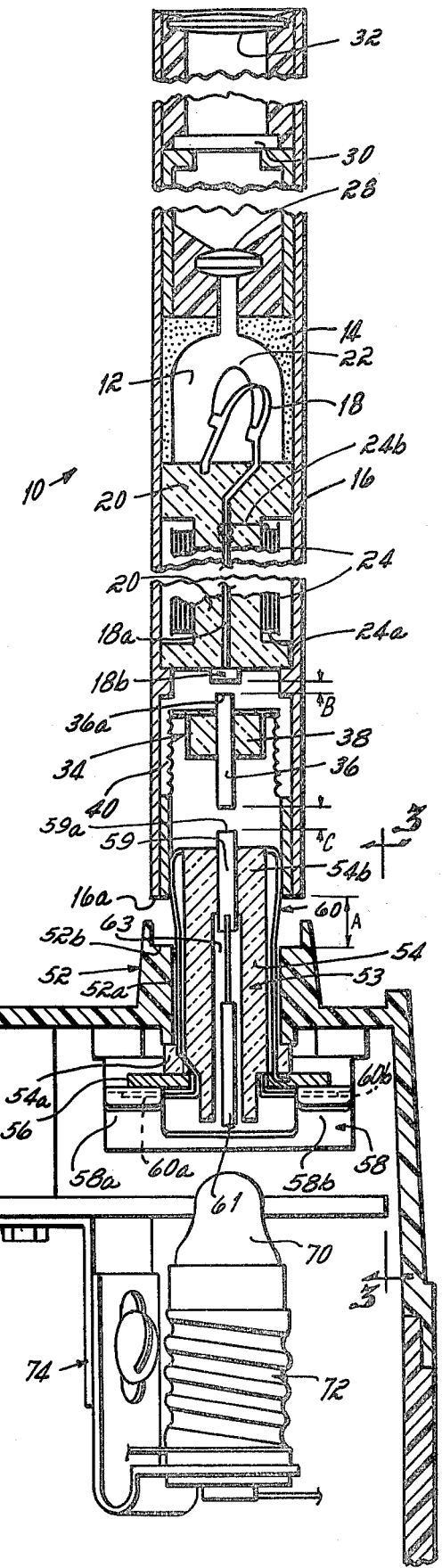

DOSIMETER CHARGING AND/OR READING APPARATUS

This invention relates to a dosimeter capacitor charging circuit for zeroing or initializing the dosimeter, and more particularly to a dosimeter charging circuit which immediately upon termination of the dosimeter capacitor charging operation is operative to automatically discharge the stray capacitance which inherently exists in the dosimeter by virtue of its mechanical construction, thereby avoiding measurement errors.

Dosimeters of the type which the charging and/or reading apparatus of this invention are designed to operate in conjunction with typically include an ionization chamber defined by an outer gas tight electrically conductive casing which is transparent to the radiation to be monitored and an inner electrode positioned within the outer electrode. A capactior connected between the inner and outer electrodes establishes an electrostatic potential in the ion chamber between the electrodes. Radiation penetrating the ionization chamber through the outer electrode ionizes the gas within the chamber, causing charge to flow between the inner and outer electrodes and the initially charged capacitor to discharge. The amount of capacitor discharge occurring during a given radiation measuring interval or cycle is proportional to the amount of ionizing radiation penetrating the chamber during that interval or cycle. An indication of the change in capacitor charge, and hence the amount of radiation, in a measuring interval can be obtained by monitoring the movement of a flexible electrometer electrode located within the chamber which is connected to the inner electrode. The flexible electrometer electrode moves toward the fixed-position inner electrode in a given measuring interval an amount proportional to the reduction in charge of the capacitor, and hence the amount of incident radiation, which occurred during the measurement interval.

To initialize or zero the dosimeter at the commencement of a measuring interval, the dosimeter capacitor is charged from an external high voltage D.C. power supply. The charge applied to the dosimeter capacitor moves the flexible electrometer electrode away from the inner electrode to some arbitrary position correlated to "zero". Thereafter, as radiation penetrates the ionization chamber to discharge the dosimeter capacitor, the flexible electrometer electrode moves toward the fixed electrode in proportion to the quantity of incident radiation. At any given time the position of the flexible electrometer electrode can be observed, and its relative movement from the "zero" position determined, to ascertain the amount of radiation which has occurred since the "zeroing" operation.

To facilitate charging of the dosimeter capacitor, it has been the practice to provide the dosimeter with an outer electrically conductive tubular protective housing which is in electrical contact with the outer electrode of the ionization chamber, and a movable contact within the tubular housing which can be shifted axially between a charging position in contact with the inner electrode of the ionization chamber and a non-charging position displaced therefrom. When it is desired to charge the dosimeter capacitor, positive and negative high voltage terminals, or charging electrodes, output from the dosimeter charging apparatus are brought into contact with the movable contact and outer conductive housing of the dosimeter. While so engaged, the dosimeter housing is moved axially relative to the charger electrodes such that the movable contact of the dosimeter is urged axially into contact with the inner electrode of the ionization chamber to complete a charging path between the dosimeter capacitor and the charging electrodes of the charger. Commencement of the capacitor charging operation begins once this charging path is complete.

By way of background, the need for the movable electrode arises because of the desire to provide a moisture-free enclosure for the exterior surface of the ion chamber lying between the outer cylindrical chamber electrode and the exposed end of the stationary, axially disposed inner chamber electrode. Provision of such a moisture-free environment minimizes moisture-induced conductivity paths on the exterior surface of the ionization chamber between the exposed portions of the electrodes thereof, which in turn minimizes capacitor charge leakage between the chamber electrodes. In order to provide the foregoing moisture-free environment, and do so in a manner that permits charging the dosimeter capacitor, it has been found desirable to provide the dosimeter with a movable electrode which is axially aligned with the inner chamber electrode. The movable electrode is movable between an inner position in electrical contact with the inner ionization chamber electrode and an outer position axially displaced therefrom. The movable electrode extends axially through an insulator disc which is mounted to the outer cylindrical conductor by a flexible moisture impervious bellows. The bellows and movable electrode insulator mounting disc combine to enclose the region between the outer cylindrical ion chamber conductor and the outer exposed end of the axially disposed stationary inner ion chamber electrode.

One of the problems which it has been discovered exists in present day dosimeter charging operations inheres in the fact that, by virtue of the mechanical construction of the dosimeter, there inherently is stray capacitance between the movable dosimeter contact and the dosimeter housing. This stray capacitance, during the charging of the dosimeter capacitor described above, becomes charged. The charge on the stray capacitance, when it leaks off, which it gradually does during the ensuing measurement interval, is the source of erroneous radiation measurements. Specifically, erroneous measurements result by virtue of the fact that discharge of the stray capacitance causes the flexible electrometer electrode to move toward the inner electrode, thereby giving the appearance that the dosimeter capacitor has become discharged by impingement of radiation on the ionization chamber, or charge leakage across it insulator, when in fact the component of movement of the flexible electrometer electrode induced by discharge of the stray capacitance is independent of radiation introduced into the ionization chamber or charge leakage across its insulator.

It has been an objective of this invention to provide apparatus for charging a dosimeter capacitor which is effective upon conclusion of the dosimeter capacitor charging operation to immediately discharge the stray capacitance inherent in the dosimeter by virtue of its mechanical construction, thereby avoiding false measurements associated with movement of the flexible electrometer electrode attributable to stray capacitance discharge. This objective has been accomplished in accordance with certain principles of this invention by providing solid state switch means connected between the positive and negative electrodes of the dosimeter charger, which switch means are immediately rendered conductive to short circuit the movable contact and housing of the dosimeter, and thereby discharge the stray capacitance associated therewith, when the high voltage D.C. power supply has become de-energized to terminate the dosimeter capacitor charging operation and the dosimeter movable contact and inner electrode have become disengaged, but prior to disengagement of the dosimeter movable contact and housing from the charger electrodes.

In a preferred embodiment of the invention the charger includes a spring biased axially shiftable nonconductive post which has mounted on it in spaced apart relation the positive and negative charging electrodes. The post is designed to fit within the open end of the tubular dosimeter housing below the movable dosimeter contact. Underlying the shiftable post is a switch responsive to movement of the post from a normal extended position to a retracted dosimeter charging position. When the tubular dosimeter housing is engaged with the post such that the movable dosimeter contact and housing make electrical contact with the positive and negative charging electrodes, and the dosimeter initially moved relative to the charger, the post is urged to its retracted position by the movable dosimeter contact and the underlying switch is actuated to energize the high voltage D.C. power supply and place the solid state switch means in a nonconductive condition to remove the short circuit from across the charging electrodes. When the dosimeter housing is now advanced further, the additional movement of the dosimeter housing relative to the charger does cause the movable dosimeter contact to be moved relative to the dosimeter housing by the post into engagement with the inner electrode of the dosimeter, completing a charging circuit from the high voltage D.C. charger supply electrodes to the dosimeter capacitor.

At the conclusion of the dosimeter capacitor charging operation, the dosimeter housing is moved away from the charger. Initial movement of the dosimeter housing relative to the charger causes the movable dosimeter contact to move relative to the housing out of engagement with the inner electrode of the dosimeter, interrupting the circuit path between the dosimeter capacitor and the positive and negative charging electrodes of the charger. At this point, however, the movable contact and housing of the dosimeter are still in electrical contact with the positive and negative charging electrodes of the charger and the high voltage D.C. charging supply is still energized. As the dosimeter housing is now moved further away from the charger, the movable contact and housing of the dosimeter remain in electrical contact with the positive and negative electrodes of the charger, but the post moves away from its retracted position, deactuating the underlying switch means. Deactuation of the underlying switch means de-energizes the high voltage D.C. power supply and, more significantly, places the solid state switch in its conductive condition which, in turn, places a short circuit across the positive and negative terminals of the charger. This is effective, since the charger electrodes are still in contact with the dosimeter movable contact and housing, to discharge the stray capacitance therebetween. Further movement of the dosimeter housing away from the charger results in disengagement of the positive and negative charger electrodes from the dosimeter movable contact and housing.

Discharge of the stray capacitance does cause the flexible electrometer electrode to shift toward the inner electrode of the dosimeter. However, by observing the position at which the flexible electrometer electrode stabilizes upon discharge of the stray capacitance, a new or adjusted zero position for the dosimeter can be ascertained. Any subsequent movement of the flexible electrometer electrode from this new or adjusted zero position is attributable solely to radiation impingement on the ionization chamber. By observing the distance the movable electrode deflects from the new or adjusted zero position during the ensuing measurement interval, an indication can be obtained of the amount of radiation penetrating the dosimeter ionization chamber during the measurement interval, which indication is free of measurement errors of the type previously described associated with the gradual leakage of charge from the stray capacitance during the measurement interval.

These and other features and advantages and objectives of the invention will become more readily apparent from a detailed description thereof taken in conjunction with the drawings in which:

FIG. 1 is a vertical elevational view in cross-section of the dosimeter charger of this invention with its charging post partially inserted into the charging end of a dosimeter;

FIG. 2 is a cross-sectional view along line 2—2 of FIG. 1;

FIG. 3 is a cross-sectional view along line 3—3 of FIG. 1; and

Figure 4:
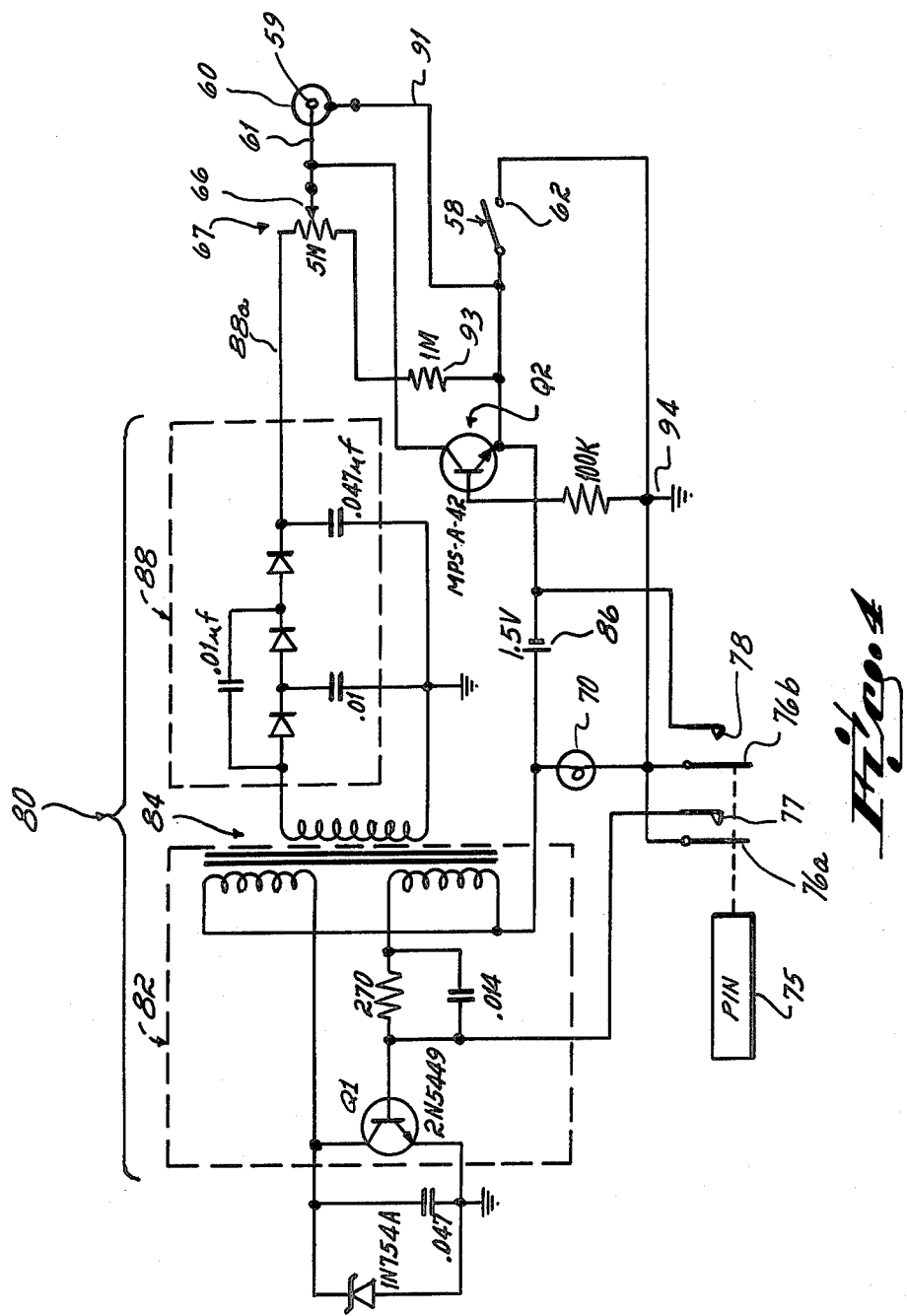
FIG. 4 is a schematic diagram of the circuit embodied in the dosimeter charger of this invention.

To facilitate a more complete and thorough understanding of the dosimeter charger of this invention, a description of a dosimeter of the general type with which the invention finds particular utility is provided. Specifically, and with reference to FIG. 1, a dosimeter 10 is shown having a generally elongated cylindrical shape. Included in the dosimeter 10 is an ionization chamber 12 defined by an outer electrically conductive enclosure 14 which is in electrical contact with an electrically conductive cylindrical protective housing or case 16. Both enclosure 14 and case 16 are permeable to the radiation the dosimeter is designed to monitor. Disposed within the ionization chamber 12 is a stationary, rigid, U-shaped electrically conductive metal frame 18 which is mounted in a generally vertical or axial disposition to an insulative bobbin 20 which seals the lower end of the conductive enclosure 14 defining the ionization chamber 12. The bobbin 20 is transparent to visible light for reasons to become apparent hereinafter. Mounted on the frame 18 is a flexible quartz fiber electrode 22, which is also U-shaped. A capacitor 24 surrounds the central portion of the bobbin 20. The capacitor 24 has one terminal thereof electrically connected to the housing 16 and enclosure 14 via lead 24a. The other capacitor terminal is connected to the frame 18 and quartz fiber 22 via lead 24b and a downwardly directed extension 18a of the frame 18 which passes centrally through the bobbin 20.

When the capacitor 24 is electrically charged, an electrostatic potential is applied between the conductive enclosure 14 surrounding the ionization chamber 12 and the combination frame 18 and quartz fiber 22. When ionizing radiation impinges on the ionization chamber 12 the gas within the chamber 12 ionizes. Ionization of the gas in the ionization chamber 12 causes charge to flow between (a) the enclosure 14 which is connected to one plate of the capacitor via the housing 16 and capacitor lead 24a and (b) the frame 18/quartz fiber 22 which is connected to the other plate of the capacitor via lead 24b and frame extension 18a. This charge flow discharges the capacitor 24. Since the quartz fiber 22 and the frame 18 are both connected to the same plate of the capacitor 24, both the quartz fiber and the frame are charged with like polarity, producing electrostatic repulsion forces between them. The greater (or lesser) the charge on the capacitor the greater (or lesser) will be the electrostatic repulsion which exists between the quartz fiber 22 and the frame 18. Since the quartz fiber 22 is flexible and free to move relative to the stationary rigid frame 18, as the charge on the capacitor 24 varies, the physical separation between the quartz fiber 22 and the frame 18 also varies, with the variation in spacing being in direct proportion to the variation in capacitor charge. As a consequence, the degree of physical separation between the movable quartz fiber 22 and the rigid frame 18 is a measure of the charge on the capacitor 24.

If the capacitor 24 is initially charged to some preestablished level, the flexible quartz fiber 22 will assume some initialized, or "zero", position correlated to the initial capacitor charge. If, thereafter, ionizing radiation is incident on the ionization chamber 12, charge will flow between the enclosure 14 and the frame 18/quartz fiber 22, causing the capacitor 24 to become discharged to the extent of the ionizing radiation which has impinged on the ionization chamber 12. The discharge of the capacitor 24 results in movement of the quartz fiber 22 toward the frame 18, the extent of movement being proportional to the capacitor discharge, which in turn is proportional to the amount of ionizing radiation incident on the chamber 12. Thus, displacement of the fiber electrode 22 toward frame 18 from some initial, or "zero", position, following charging of capacitor 24, can be used as a measure of the amount of radiation incident on the chamber 12 since the capacitor was charged and the dosimeter initialized or "zeroed".

The position of the quartz fiber electrode 22, particularly for the purpose of detecting the amount it has moved in response to incident radiation on the ionization chamber 12, is observed by projecting the position of the quartz fiber 22 through an objective lens 28 onto a calibrated reticle 30, which is then viewed through a microscope eyepiece 32. The faciliate projection of the position of the quartz fiber electrode 22 onto the reticle 30, light is directed upwardly through the interior of the dosimeter housing 16 via the transparent bobbin 20 and a movable charging pin assembly 34, to be described, which is substantially transparent to visible light.

The charging pin assembly 34, considered in more detail, includes an electrically conductive, elongated charging pin 36 which is axially and fixedly mounted in a transparent electrically insulative glass cylinder 38. The glass cylinder 38 is mounted for axial movement relative to the housing 16 by an extensible brass bellows 40 which interconnects the cylinder 38 and the interior of the lower end of the dosimeter housing 16. The glass cylinder 38 electrically insulates pin 36 from the bellows 40. The bellows 40 normally positions the glass cylinder 38, and hence the charging pin 36, at a point such that the upper end 36a of the charging pin is spaced slightly from a contact 18b electrically connected to the frame extension 18a, which contact 18b is securely mounted to the lower end of the bobbin 20.

To charge the capacitor 24 to some predetermined level and thereby initialize, or "zero", the position of the quartz fiber electrode 22, it is necessary to move the charging pin 36 upwardly such that its upper end 36a is in electrical contact with the contact 18b secured to the bottom of the bobbin 20 which is in electrical contact with one capacitor terminal via lead 24b and frame extension 18a, and while the charging pin is so positioned, apply a high voltage D.C. charging potential between the pin 36 and the dosimeter housing 16 which is electrically connected to the other terminal of the capacitor 24 via lead 24a. As the capacitor 24 becomes charged, the quartz fiber electrode 22 moves away from the frame 18 to an initialized, or "zero", position. When the capacitor 24 has been sufficiently charged, the pin 36 is allowed to return to its normal position spaced from the contact 18b under the retracting force of the bellows 40. In the course of travel to its normal position, the source of charging potential between the pin 36 and the interior lower end of the housing 16 is removed. The position of the quartz fiber electrode 22 at the conclusion of the capacitor charging operation, observed via eyepiece 32 in the manner described previously, constitutes the initialized, or "zero", position.

As radiation impinges on the ionization chamber 12, discharging the capacitor 24, the quartz fiber electrode 22 moves toward the frame 18 from the "zero" position. The amount of radiation incident on the chamber 12 during the interval following initialization, or "zeroing", of the dosimeter, can be observed at any time by directing light upwardly through the lower end of the dosimeter housing and observing the projected deflection of the quartz fiber electrode on the calibrated reticle 30 through the microscope eyepiece 32.

In practice, it has been found that the position to which the quartz fiber electrode 22 moves in the course of being initialized, or "zeroed", depends upon not only the charge on the capacitor 24, but also on the charge which exists between the charging pin 36 and the conductive bellows 40 which are electrically insulated from each other by the glass cylinder 38. To avoid erroneous measurements, it has been found desirable, after charging the capacitor 24 and disconnecting the electrical connection between the contact 18b and the pin charging end 36a, to intentionally and immediately discharge the capacitor established by the charging pin 36 and the bellows 40. When the capacitor 36/40 is discharged, the quartz fiber electrode 22 moves slightly toward the frame 18. It is the position of the quartz fiber electrode 22 immediately after intentionally discharging the capacitor formed by the charging pin 36 and bellow 40 which constitutes the "zero" position of the ensuing radiation measuring cycle.

If the capacitor 36/40 is not intentionally and immediately discharged in the manner described above, the charge thereon will normally, in a period anywhere between one-half hour and three hours, leak off due to surface conductivity of the glass cylinder 38. As the capacitor 36/40 discharges, the quartz fiber electrode 22 moves toward the frame 18. This movement, when observed through the microscope eyepiece 32, constitutes a source of measurement error in that it is not attributable to impingement of ionizing radiation on the chamber 12, but rather to discharge of the capacitor 36/40. As noted above, to avoid such errors, it has been found necessary after charging to the capacitor 24 to immediately discharge the capacitor 36/40.

The dosimeter charger of this invention, which has the capability of charging the dosimeter capacitor 24 and immediately thereafter discharging the capacitor 36/40, is seen in FIG. 1 to include a housing 50 having cup-shaped upper and lower mating sections 50a and 50b, preferably fabricated of plastic material which are detachably connected in a peripheral lap joint 50c. Extending from the generally flat top 50d of the housing 50 is an annular collar 52 having a central aperture 52a therethrough. Positioned within the central aperture 52a of the collar 52 is a vertically shiftable charging post 53 which consists of a transparent insulative cylinder 54 having a shoulder 54a formed at its lower extremity. An annular electrically conductive washer 56 surrounds a lower reduced diameter end of the cylinder 54 in contact with the shoulder 54a. A bifurcated, horizontally-disposed, and electrically conductive leaf spring 58 mounted to the underside of the upper housing 50d at one end thereof has a pair of spaced parallel legs 58a and 58b at the other end thereof which contact the underside of the washer 56 at diametrically opposed locations to bias the charging post 54 to its uppermost position shown in FIG. 1.

At least one U-shaped conductive wire spring is seated in a suitably configured groove formed in the exterior surface of the transparent cylinder 54. The U-shaped spring 60 has leg portions thereof 60a and 60b which project radially outwardly beyond the exterior surface of the cylinder 54 to ensure that when the lower end of the dosimeter housing 16a is positioned about the charging post 53, as shown in FIG. 1, a good electrical contact can be established between the interior surface of the lower end of the dosimeter housing 16a and the spring 60 which constitute the ground or negative output terminal of the high voltage D.C. charging circuit to be described.

Disposed within the central portion of the transparent cylinder 54 is a central, or inner, electrode 59 having an upper end 59a projecting vertically upwardly from the top surface of the cylinder. The inner electrode 59 is connected via a suitable conductor 61, which passes down through a central bore 63 in the cylinder 54, to the positive terminal of a charging circuit to be described.

The lower ends of legs 60a and 60b of the U-shaped outer electrode 60 are electrically connected to the bifurcated legs 58a and 58b of the conductive leaf spring 58. When the charging post 54 is urged downwardly by placement of the dosimeter 10 on the post and applying a downward force thereto sufficient to move the lower end 16a of the dosimeter housing proximate or in seating relationship to collar shoulder 52b in a manner to be described, the leaf spring 58 is urged downwardly by the post shoulder 54a into electrical contact with an electrical underlying terminal 62 mounted on a circuit board which is horizontally disposed within the housing 50. Contact between terminal 62 and spring 58 in response to downward movement of post 53 is effective to energize the charging circuit. Energization of the charging circuit applies a charging high voltage D.C. potential between the ground or negative outer charging spring electrode 60, which is in electrical contact with the dosimeter housing 16 which surrounds post 53, and an inner positive charging electrode 59 which is fixed to and projects upwardly from the central top surface of the post 53. The magnitude of the potential applied between the outer U-shaped electrode 60 and the central electrode 59, both of which are mounted on post 53, is dependent upon the annular position of a movable rotary wiper 66 of a potentiometer 67, the annular position of which is controlled by a knob 68 which is rotatable about a vertical axis.

Disposed below the vertically shiftable transparent charging post 53 is a light source 70, for example, a flashlight bulb, which is stationarily mounted in a suitable socket 72 secured to the circuit board 64 by a bracket 74. When the switch 58/62 is closed by depression of the charging post 53 to apply charging potential to the inner and outer electrodes 59 and 60, the lamp 70 is energized. Energization of lamp 70 causes light to be directed upwardly through the charging post 53 and the dosimeter insulator and bobbin 20, all of which are transparent, to project the deflection of the quartz fiber electrode 22 onto the calibrated reticle 30 to facilitate viewing or reading thereof via microscope eyepiece 32.

If it is desired to use the lamp 70 to read the dosimeter without charging it, the dosimeter is placed about the charging post 53 as would be done if charging were desired. However, the dosimeter is not urged downwardly to depress the charging post 53 and close the switch 58/62. Rather, a shiftable pin 75, which is slidably disposed in a bore positioned axially in the zeroing knob 68, is urged downwardly with the operator's finger or the like. The pin 75 is normally maintained in its uppermost position shown in FIG. 1 by an electrically conductive U-shaped wire spring 76 which has one end underlying the bottom of the pin and its other end secured to the printed circuit board 64. When the pin 75 is urged downwardly its initial downward motion causes one leg 76a thereof to make contact with a stationary contact 77 secured to the printed circuit board 64 at a point underlying the U-shaped spring. Further downward motion of the pin 75 causes the other leg 76b of the U-shaped spring to make electrical contact with a second electrical contact 78 which underlies the leg 76b. The vertical elevation of the contact 78 is below that of the contact 77 such that as the pin 75 is depressed and the U-shaped conductive spring legs 76a and 76b urged downwardly, a circuit is first established between leg 76a and contact 77 and thereafter an electrical circuit is established between leg 76b and contact 78.

Closure of the switch 76a/77, which occurs first as the pin 75 is depressed, de-energizes the high voltage D.C. supply of the charging circuit to prevent the application of a high voltage D.C. charging potential between the inner and outer charging electrodes 59 and 60. The subsequent electrical connection between spring leg 76b and contact 78, as the pin 75 is urged further downwardly, energizes the lamp 70. Thus, by depression of the pin 75, the lamp 70 is energized to facilitate reading the position of the quartz fiber electrode 22 of the dosimeter 10, while the high voltage D.C. supply of the charging circuit is disabled, preventing any alteration in the charge on the capacitor 24 and hence any shift in position of the quartz fiber electrode.

With reference to FIG. 4, the charger circuit includes a D.C. voltage multiplier 80 consisting of a D.C.-A.C. inverter circuit 82, a transformer 84, and an A.C.-D.C. voltage doubler 88. The D.C.-A.C. inverter circuit 82 preferably is in the form of a blocking oscillator, which in combination with the step-up transformer 84, converts 1.5 volts D.C. from a suitable supply 86, such as a D size dry cell battery, to low duty cycle A.C. voltage having a peak amplitude of approximately 125 volts. The A.C. output of the transformer 84 is applied to the voltage doubling circuit 88 which provides on its output line 88a approximately 250 volts D.C.

The D.C. output on line 88a is applied to a potentiometer 67, which has its variable tap 66 controlled by the zeroing knob 68 shown in FIG. 1. The potentiometer output 66 is applied via line 61, also shown in FIG. 1, to the inner central electrode 59 projecting from the charging post 53. The outer spring electrode 60 mounted on the peripheral surface of the charging post 53 is connected via line 91 to the negative terminal of the battery 86. The potentiometer 67, across which the positive D.C. voltage is applied from the voltage doubler output on line 88a, is connected to the negative terminal of the battery 86 via a resistor 93. By rotating the knob 68 to alter the position of the tap 66, the D.C. dosimeter capacitor charging voltage applied between the inner electrode 59 and the outer electrode 60 can be varied as desired, preferably, between approximately 40 volts D.C. and 250 volts D.C.

To energize the blocking oscillator 82 such that D.C. potential is provided on line 88a to facilitate the application of a charging potential to the capacitor 24 of a dosimeter 10 via the inner and outer electrodes 59 and 60, the switch 58/62 responsive to the downward motion of the charging post 53 is provided. The switch 58/62 is in an open circuit condition normally, that is, when the charging post 53 is not depressed by the application thereto of a downward force by the dosimeter 10 when positioned about the post. With the switch 58/62 in an open circuit condition, the circuit path between the negative side of the battery 86 and ground 94 is incomplete. As such, the blocking oscillator 82 is not energized and the D.C. dosimeter capacitor charging potential is not applied to the inner and outer electrodes 59 and 60 via lines 61 and 91. When, however, a dosimeter 10 is placed on the charging post 53 and a downward force applied thereto, the cylinder 54 moves downwardly closing the switch 58/62. This energizes the blocking oscillator 82 which via the transformer 84 and voltage doubler 88 provides a D.C. potential across the potentiometer 67 which in turn via lines 61 and 91 applies a charging potential to the inner and outer electrodes 59 and 60. The D.C. charging potential present across the inner and outer electrodes 59 and 60 is applied to the dosimeter capacitor 24 via a) a first path which includes the charging pin 36 of the dosimeter 10 which moves into electrical contact with the contact 18b after the pin 36 has engaged the electrode end 59a and depressed the post 53 to actuate switch 58/62 and energize the oscillator 82 and lamp 70, and b) a second path which includes the outer spring electrode 60 and the dosimeter housing 16.

For reasons previously described, when the dosimeter capacitor 24 is charged to the desired level, it is desirable to discharge the capacitor established by the charging pin 36 and the bellows 40. To accomplish discharge of capacitor 36/40, a transistor Q2 having its emitter-collector path connected between the inner and outer electrodes 59 and 60 is provided. The transistor Q2 is biased such that it is rendered conductive when the switch 58/62 is in the open-circuit condition, which occurs upon initial upward removal motion of the dosimeter housing 16 relative to the collar 52 when the dosimeter pin 36 and casing 16 are still in contact with the inner and outer electrodes 59 and 60, respectively, of post 53, but the charging post is no longer depressed to its full lowermost position and the pin 36 is no longer in contact with the contact 18b. Under such circumstances, the switch 58 returns to its normally open-circuit position, allowing the transistor Q2 to be rendered conductive. Conduction of transistor Q2 applies a short-circuit across the inner and outer electrodes 59 and 60 of the charging post 53 to discharge the capacitor 36/40 of the dosimeter via pin 36 and housing 16. Thus, as soon as the dosimeter 10 has been elevated relative to collar 52 a distance sufficient to allow the pin 36 to disengage the contact 18b and thereafter allow the charging post 54 to rise sufficiently to open the switch 58/62, but with the electrodes 59 and 60 still contacting the pin 36 and housing 16, the transistor Q2 is rendered conductive and the capacitor 36/40 discharged. In practice, it has been found that the capacitor 36/40 discharges fully in a few milliseconds or less. Subsequent to discharge of capacitor 36/40, further vertical movement of the dosimeter 10 relative to the collar 52 results in complete disengagement of the charging post 53 electrodes 59 and 60 relative to the lower pin 36 and open end of the dosimeter housing 16a. Due to the rapid discharge of the capacitor 36/40 via the emitter-collector path of transistor Q2 once switch 58/62 is returned to its normal open-circuit position, and the fact that after the switch 58/62 has returned to its open position it is necessary to elevate the dosimeter relative to the charging post 53 and appreciable distance during which electrodes 59 and 60 remain engaged with pin 36 and dosimeter casing 16, discharge of the capacitor 36/40 is assured regardless of how rapidly an operator might attempt to removed the dosimeter from engagement with the charging post.

The current drain of the transistor Q2 when the switch 58/62 is in its normal, open-circuit position is negligible compared to the shelf life of the battery 86.

To insure that only the capacitor 36/40 is discharged and not also capacitor 24 when the dosimeter is lifted away from collar 52 and pauses for Q2 rendered conductive upon upward movement of post 53 and open-circulating of switch 58/62, it is necessary that as the dosimeter 10 is moved away from the collar 52, that the pin 36 disengage the contact 36a prior to initial upward movement of the post 53 which open-circuits switch 58/62 to render conductive transistor Q2. This is achieved by making the spring constant of bellows 40 greater than that of leaf 58. Also, the distance 'A' must equal or exceed the sum of distance 'B' and distance 'C'.

To facilitate reading the dosimeter while it is engaged with the charging post 53 and the post depressed to close the switch 58/62 and energize the blocking oscillator 82 to effect application of the high D.C. voltage across terminals 59 and 60 for charging the dosimeter capacitor 24 which is in electrical contact therewith, the lamp 70 is connected in series with the switch 58/62 across the battery 86. With the lamp 70 so connected, when the dosimeter 10 is engaged with the charging post 53 and the post 53 depressed to close switch 58/62, the lamp 70 is energized and illuminates the lower end of the dosimeter to facilitate reading of the position of the quartz fiber electrode 22 through the microscope eyepiece 32. When the dosimeter 10 is disengaged from the post 53 and the switch 58/62 returned to its open circuit condition, lamp 70 is de-energized.

To facilitate reading the position of the quartz fiber electrode 22 without charging the dosimeter capacitor 24, switches 76b/78 and 76a/77 are provided. With the dosimeter 10 engaged with the charging post 54, but with the engagement therebetween insufficient to cause the post to be depressed to close switch 58/62, the pin 75 is manually depressed to effect a reading operation. Initial depression of pin 75 under the conditions indicated causes switch 76a/77 to close. This grounds the base of transistor Q1 of the blocking oscillator 82, preventing the application of a D.C. charging potential to the multiplier output line 88a, which in turn prevents the application of a charging potential across the inner and outer electrodes 59 and 60. Further depression of the pin 75 causes the switch contacts 76b/78 to close. Closure of switch 76b/78 completes an energization circuit path for the lamp 70, causing light to be directed upwardly through the post 53 and the dosimeter to facilitate reading of the position of the quartz fiber electrode 22 via the microscope eyepiece 32. The lamp energization path through switch 76b/78 during a "read-only" operation is independent of the path through switch 58/62 during a "read and charge" operation.

Thus, when the dosimeter 10 is engaged with the post 53, but not urged downwardly sufficiently to depress the post 53, and the pin 75 is depressed to sequentially close switches 76a/77 and 76b/78, the lamp 70 is energized to project the position of the quartz fiber electrode 22 on the reticle 30 to facilitate viewing of its position via the eyepiece 32, but the blocking oscillator 82 is not energized and D.C. charging potential is not applied across the inner and outer electrodes 59 and 60. Accordingly, the dosimeter is read, but not charged.

We claim:

1. Apparatus for charging a dosimeter having a capacitor connected between first and second relatively stationary electrodes, an ionization chamber exposed to at least portions of said first and second electrodes to discharge said capacitor when ionizing radiation penetrates said chamber, a movable electrode electrically connected to said first electrode which deflects varying amounts depending upon the charge present on said capacitor, a movable electrical contact shiftable between a noncharging position spaced from said first electrode and a charging position contacting said first electrode, and a first electrical insulator mounting said movable contact and said second electrode in spaced relation when said movable contact is in its charging and noncharging positions, said dosimeter charger apparatus comprising:
   a first charging electrode and a second charging electrode,
   a second electrical insulator mounting said first and second charger electrodes in fixed spaced relation to each other susceptive of contact with said movable contact and second dosimeter electrode, respectively, when it is desired to charge said dosimeter,
   a high voltage D.C. supply connected between said first and second charger electrodes for applying therebetween a charging potential when said power supply is energized,
   a first switch means connected to energize and deenergize said power supply when actuated and deactuated, respectively,
   means mounting said second insulator for movement between an inactive position in which said first switch means is deactuated to de-energize said power supply and an active position in which said first switch means is actuated to energize said power supply, and
   a solid state electronic switch connected between said first and second charger electrodes for short-circuiting said first and second charger electrodes when placed in a conductive condition by movement of said second insulator to its inactive position, said solid state electronic switch being nonconductive when said first switch means is actuated and said power supply is energized by movement of said second insulator to its active position,
   said charger apparatus being operative to charge said capacitor by first engaging said movable contact and second electrode of said dosimeter with said first and second electrodes of said charger, respectively, and thereafter when so engaged moving said first dosimeter electrode toward said first switch means to thereby sequentially (a) advance said second insulator toward said first switch means to its active position to actuate said first switch means and energize said power supply to apply a potential between said first and second charger electrodes and render nonconductive said solid state electronic switch, and (b) move said movable contact into contact with said first dosimeter electrode to charge said capacitor from said energized power supply via a first series path including said first charger electrode and said movable contact and first electrode of said dosimeter and a second series path including said second electrodes of said dosimeter and charger,
   said charger apparatus being operative upon movement of said first dosimeter electrode away from said first switch means to sequentially (a) disengage said first dosimeter electrode and movable contact while said movable contact and first charger electrode remain engaged and said second charger and dosimeter electrodes remain engaged, (b) deactuate said first switch means to de-energize said power supply and place said solid state electronic switch in its conductive state while said movable contact and first charger electrode are engaged and said second charger and dosimeter electrodes are engaged to short-circuit said movable contact and second dosimeter electrode via said first and second charger electrodes, and (c) disengage said movable contact and second dosimeter electrode from said first and second charger electrodes, respectively.

2. The charger apparatus of claim 1 further comprising:
   a light source mounted to illuminate, when energized, the movable electrode of a dosimeter positioned to have its capacitor charged by said charger, said light source being connected to said power supply via said first switch means to energize said light source and permit dosimeter reading automatically as an incident to charging said capacitor,
   a second switch connected to said power supply and actuatable independently of said first switch means for preventing said power supply from providing said high D.C. voltage, and
   a third switch connected between said power supply and light source and actuatable independently of said first switch means to energize said light source from said power supply, and
   manually actuatable means for selectively sequentially activating said second and third switches independently of said first switch means to facilitate reading of said dosimeter without charging said capacitor.

3. The apparatus of claim 1 wherein said second insulator is an elongated post having an upper end at which said first charger electrode is exposed centrally thereof for engagement with said movable contact, a lower end located proximate said first switch means to actuate it when advanced thereagainst, and an upper peripheral region from which said second charger electrode yieldingly projects radially outwardly for contacting said second dosimeter electrode when said movable contact engages said first charger electrode.

4. The apparatus of claim 2 wherein said second insulator is an elongated post having an upper end at which said first charger electrode is exposed centrally thereof for engagement with said movable contact, a lower end located proximte said first switch means to actuate it when advanced thereagainst, and an upper peripheral region from which said second charger electrode yieldingly projects radially outwardly for contacting said second dosimeter electrode when said movable contact engages said first charger electrode.

5. The apparatus of claim 4 wherein said post is tansparent and said light source is located to pass light through said post when energized to facilitate reading a dosimeter located to have its movable contact and second electrode engaged with said first and second charger electrodes, respectively.

* * * * *